United States Patent Office 2,919,193
Patented Dec. 29, 1959

2,919,193

PROCESS OF PREVENTING HAZE FORMATION IN BEVERAGES

Nils Svante Berntsson, Goteborg, Sweden

No Drawing. Application June 4, 1957
Serial No. 663,341

Claims priority, application Great Britain June 8, 1956

4 Claims. (Cl. 99—48)

The present invention relates to a method of reducing or preventing formation of hazes in fermented or unfermented beverages produced from cereals, fruits, other vegetable materials or parts thereof, and especially in malt beverages, e.g. beer, and in fruit juices and wines.

Although beverages of this type are clear immediately after having been poured into for instance bottles they have often a tendency, when stored, to form hazes which deteriorate their appearance and taste. A similar haze may be formed on cooling. The composition of the haze or precipitate formed may vary and is not completely known, but it is assumed that the haze or precipitate often is caused by high-molecular proteins which either precipitate themselves or form complex compounds with tannin (tannic acid) naturally present or specially added, these complexes being soluble at room temperature but precipitating on storage or cooling. When beer is produced, it is often treated with proteolytic enzymes or with tannin so that the undesirable high molecular proteins which are present are precipitated before the bottle-filling operation to the greatest possible extent. However, in this way, it is not possible to prevent completely haze formation on storage or cooling of the beer, as it seems that also the tannin itself is capable of forming hazes after removal of the tannin-protein complex formed due to the tannin addition. This may possibly be due to polymerization or oxidation reactions occurring during the storage.

U.S. Patent 2,688,550 describes a method of preventing the formation of hazes of the aforesaid type by addition of a precipitating agent, polyvinyl pyrrolidone, hereinafter sometimes referred to as PVP, which causes tannin and any tannin-protein complexes that may have remained in solution to be precipitated. According to the statements made in that patent, it is important in the process that neither too little nor too much polyvinyl pyrrolidone be added, as otherwise the precipitation obtained will be unsatisfactory. However, it has been found that a precipitation thus performed cannot always completely prevent formation of hazes on subsequent storage or cooling, this being probably due to incomplete precipitation and to the possibility of new insoluble complex compounds being formed during storage.

The quantity of PVP necessary for obtaining optimum or maximum precipitation of haze forming constituents in beer beverages varies from one kind or quality of beer to another and, depending upon the average molecular weight of the PVP used, from 0 to about 8 g. per hectolitre (cf. the above-mentioned patent according to which the quantity of PVP added may vary between 0.5 and 2 pounds per one hundred barrels, i.e. from about 2 to about 8 gms. per hectolitre). The statements made in the aforenoted patent clearly show that the PVP used necessarily has an average molecular weight of above about 15,000, since in tests it has been found that PVP having a lower average molecular weight than about 15,000 has no ability to accomplish precipitation of the haze forming constituents of beer.

The present invention is based upon the surprising discovery that it is possible to prevent the formation of a haze in beverages such as, for instance, malt beverages, fruit juices and wines, by the addition of polyvinyl pyrrolidone or a homologue thereof in an excess over the above-mentioned quantity, i.e. 0 to 8 g. per hectolitre, which is necessary for maximum precipitation of the haze forming constituents. The process of the instant invention thus comprises adding polyvinyl pyrrolidone in a total quantity of at least 1 g. per hectolitre and in any case in an excess quantity of at least 50% over that needed for maximum precipitation. The stated lower limit 0 g. per hectolitre for the quantity of PVP that is needed for maximum precipitation either refers to the case (1) in which PVP having an average molecular weight of below about 15,000 is used and thus cannot form any precipitate or refers to the case (2) in which the kind or quality of beverage, e.g. beer, used does not give any precipitate with PVP even if the average molecular weight of the PVP used is above about 15,000. In the first-mentioned case, i.e. when PVP having a lower average molecular weight than 15,000 is used, it has been found, that a good result is obtained if the treatment with PVP is carried out according to the above-mentioned invention, i.e. by adding at least 1 g. of PVP per hectolitre. In the second case there is also obtained a good result if to the beverage there is added at least 1 g. of PVP independent of its average molecular weight. While thus an excess of PVP of 1 g. per hectolitre might be considered as usable it has been found that when using PVP of an average molecular weight below about 15,000 or above about 15,000 it is suitable to add totally at least 5 gms. of PVP per hectolitre provided that there is added at least 50% in excess over the quantity of PVP of 0 to 8 gms. per hectolitre that is needed for maximum precipitation of the haze forming constituents with the PVP in question.

The upper limit for the quantity of PVP to be added is not critical but is first of all determined by the costs for the PVP used. However, irrespective of the costs it is not suitable to add more than 500 gms. per hectolitre as in such a case the desirable properties of the beer, e.g. the flavor, the foam forming property, etc., might be impaired. It has been found that no substantial advantages are obtained when more than about 100 gms. of PVP are added per hectolitre of the beer irrespective of whether the PVP used has a higher or lower molecular weight than about 15,000.

From the above it can be seen that the total quantity of PVP to be added may vary between 1 and 500 gms. per hectolitre. However, it is usually more suitable to add a total quantity of between 5 and 50 gms. of PVP per hectolitre, provided that there is added at least 50% over the quantity of 0 to 8 gms. of PVP per hectolitre that is needed for maximum precipitation of the haze forming constituents. According to the invention PVP having an average molecular weight below about 15,000 is most preferably used as this kind of PVP does not form any precipitate at all and as the necessary quantity thereof is somewhat lower than that needed when using PVP having a higher average molecular weight this being advantageous for instance of economic and practical reasons.

As mentioned above the average molecular weight of the PVP used may be both above and below about 15,000. As a matter of fact, it is possible according to the invention to use PVP having an average molecular weight as low as about 550, i.e. approximately corresponding to the pentamer of vinyl pyrrolidone, or as high as about 2,500,000. However, in order to obtain good results it is usually necessary to use PVP having an average molecular weight of at least about 2,000 and the best results are usually obtained when using PVP having an average molecular weight of about 7,500 to 40,000. As can be seen from the above it is especially suitable to use PVP having an average molecular weight of between about 7,500 and 15,000 as a lower quantity thereof is necessary and as no precipitate is formed at the addition which might be of value especially when the addition is made after the last clarification before the bottle filling.

The invention comprises at least four alternative embodiments of the process all having in common that PVP is added to the beverage in a total quantity of at least 1 g. per hectolitre and in any case in a quantity of at least 50% over the quantity of PVP needed in each case for maximum precipitation of the haze forming constituents. The PVP then and later on during storage forms soluble complexes or compounds with haze forming constituents that are present at the addition of the excess of PVP or that are possibly formed later on and are then converted to such a soluble state by the excess of PVP present.

According to the first embodiment of the instant process, there is at first added PVP having the ability to form a precipitate, i.e. having an average molecular weight above about 15,000, in such a quantity that the maximum amount of precipitate is formed. The quantity of PVP needed therefor is easy to determine by a preliminary test that may be carried out in the manner described below, and is usually between about 2 and 8 gms. per hectolitre. The precipitate formed is then removed in any suitable way, for instance by filtering. To the beverage there is then added PVP in an excess over the quantity added at first the said excess being at least 50%. The total quantity added should, however, at least be 1 g. and preferably between 5 and 50 gms. per hectolitre.

According to the second embodiment of the instant process PVP having the ability to form a precipitate is added directly in a total quantity of at least 1 g. and preferably between 5 and 50 gms. per hectolitre but at least in an excess of 50% over the quantity that has been determined in advance by a simple test as necessary for maximum precipitation of the haze forming constituents and which usually varies between 0 and about 8 gms. per hectolitre. The precipitate which in some cases might be formed at this addition enters into solution and is thereupon present in the form of a soluble PVP-complex or a soluble compound which is stable during a very long period of time.

According to the third embodiment of the instant process there is used PVP which has an average molecular weight below about 15,000 and which has no ability to form a precipitate. PVP of this kind is added in a total quantity of at least 1 g. and preferably between 5 and 50 gms. per hectolitre of the beverage. PVP then directly forms soluble complexes or compounds and the excess present is sufficient to prevent the later formation of a haze due to the formation of haze forming compounds in the beverage during storing.

According to the fourth embodiment of the instant process there is added PVP in a total quantity of at least 1 g. preferably between 5 and 50 gms. per hectolitre to beverages in which haze forming compounds of the kind giving a precipitate with PVP are not present, and in which other haze forming compounds that are present from the beginning and that do not form a precipitate with PVP or haze forming compounds formed later on are kept in solution in the form of stable soluble complexes or soluble compounds by the excess of PVP which is present in the beverage.

By the excess of PVP present in the beverage it is also possible to prevent the formation of precipitates of insoluble high molecular tannin-containing or tannin-like substances formed during storage. It has also been found that when an excess of PVP is added according to the invention the taste and flavour of the beverage will be improved, and, in the case of beer, also the foam-forming capacity and foam stability. A possible explanation to the improvement achieved in said foam forming capacity and foam stability is that certain high molecular proteins the presence of which is considered necessary to bring about foam formation and foam stability are prevented from being precipitated.

In order to determine the quantity of PVP which gives a maximum amount of precipitate and usually varies between about 2 and about 8 gms. per hectolitre a given volume is taken from the beverage as finally obtained or while under preparation and is admixed with varying quantities of PVP. After a day or so it is easy to determine visually or by separation, e.g. by centrifugation, the quantity of PVP which has given the maximum amount of precipitate. Thereafter, one of the above described embodiments are applied. According to the embodiment I there is added to the beverage the determined quantity of PVP so that the maximum amount of precipitate is formed. The precipitate is then removed, e.g. by filtering, and there is then further added at least 50% of the first quantity of PVP added. There is thus preferably added a total quantity of PVP of between 5 and 50 gms. per hectolitre. According to embodiment II the whole quantity (i.e. the quantity for precipitation and the excess) is directly added. When PVP having an average molecular weight below about 15,000 is used the total quantity of PVP is also added directly (embodiment III or IV). However, it should be understood that the total quantity of PVP added in each separate case has to be at least 1 g. per hectolitre.

Polyvinyl pyrrolidone which is also a known blood plasma substitute is not harmful when taken orally and may therefore be added to beverages without any risk. PVP dissolves rapidly in water to a completely clear solution which is stable when boiled, and consists of a synthetic polymer having a composition corresponding to the formula

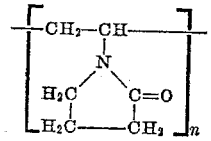

in which $n$ represents an arbitrary number. The PVP-preparations that are marketed always consist of mixtures of vinyl pyrrolidone polymers having different polymerization degree, i.e. different molecular weight. For that reason no definite molecular weight is mentioned herein but only the average molecular weight for each PVP-mixture in question. However, the invention is not limited to the use of mixtures of such polymers but can be applied with the same advantages if a polyvinyl pyrrolidone consisting of one single polymer having a definite composition should be available.

The PVP may be added either in the form of a powder or in the form of a solution in water or in the beverage in question. It may be added during any stage of the preparation of the beverage, though suitably after the removal of any solid precipitates that are present. The invention may with particular advantage be applied in the production of beer, for instance lager beer, small beer, porter, or stout. In these manufacturing processes, the PVP may be added at any convenient stage between the mashing and bottle filling in combination with clarification, e.g. filtration or centrifugation, pasteurization, treatment with ascorbic acid, proteolytic enzymes, bentonite, kieselguhr etc. If the beverage is treated with tannin to precipitate high molecular proteins the PVP addition will of course have to be made after the tannin-protein precipitate has been filtered off. However, the addition is preferably made immediately before, during or after the clarification which is carried out after the storing of the beverage, and prior to the bottle filling step. Especially good results are obtained if the addition of the PVP according to any of the above mentioned embodiments II, III or IV of the invention is made after the final clarification. If embodiment I is used the first addition of the PVP is preferably carried out at the end of the storage but before the final clarification, the necessary PVP excess being added after this final clarification. The beverage may be carefully stirred if this is considered necessary. For instance, in order to improve the foam formation capacity and the foam stability of beer, the addition may be made during or after the mashing step and during storage, in which case the so-called chill haze is completely or partially prevented from precipitating.

The addition is preferably effected at temperatures between −5° C. and +25° C. but can also be carried out with simultaneous heating, e.g. at temperatures between room temperature and 100° C., for instance in connection with pasteurization, or at still higher temperatures, for instance in combination with sterilization, if any. If the addition is made immediately before the beverage is to be clarified, e.g. filtered, and filled into bottles it is for economical reasons often not suitable to have it subjected to a special heating.

When carrying out the process of the present invention, it is suitable first to prepare a solution of PVP in water or in the beverage to which the PVP is to be added. This solution may be of any desired possible concentration but should preferably have a PVP-content of about 10 to 50%.

With quite the same advantage, the invention may be applied in the production of any beverage which is known to form hazes due to the presence of tannin or tannin-protein complexes or compounds when being stored or cooled, thus for instance not only in the production of malt beverages but also in the production of fruit juices and wines. The addition effected according to the invention will bring about an improvement of in the first place storage stability but also in respect of flavour and taste.

The invention is further illustrated by the following examples which, however, do not limit the invention in any way.

Example 1.—A treatment with PVP was carried out according to U.S. Patent No. 2,688,550 and according to the above described embodiments I, II and III according to the invention using aliquots of beer obtained from the same mash. In the treatment according to the U.S. patent the PVP-addition was made (A) when the beer was transferred from the fermentation cellar to the storage cellar, and (B) after a preliminary clarification 20 days before the final clarification. A portion of the beer treated according to (B) above was also treated with PVP after the final clarification according to embodiment I of the present invention. Additions according to embodiments II and III were made to the clarified beer a day before the bottle filling. The beer was pasteurized in all cases. Occurring oxidation and chill hazes were observed and the results obtained are shown in the following Table 1. The term "oxidation haze" means the haze formed when storing beer at 25° C. and the term "chill haze" means the haze observed at 0° C. and formed when storing beer alternatingly 6 days at 25° C. and 1 day at 0° C.

Table 1

| Process | Added amount of PVP for maximum prec., gms./hl. | Total amount of PVP added, gms./hl. | Number of weeks, until a haze is formed | |
|---|---|---|---|---|
| | | | Chill haze | Oxidation haze |
| Control | | | 3 | 18 |
| U.S. patent: | | | | |
| A | 3.5 | 3.5 | 4 | 21 |
| B | 3.5 | 3.5 | 5 | 22 |
| Embodiment I | 3.5 | 10 | 12 | 29 |
| | 3.5 | 20 | 19 | 39 |
| | 3.5 | 30 | 19 | 40 |
| Embodiment II | | 5 | 6 | 24 |
| | | 10 | 10 | 28 |
| | | 20 | 17 | 36 |
| | | 30 | 19 | 39 |
| Embodiment III | | 5 | 16 | 25 |
| | | 10 | 40 | 46 |
| | | 20 | 61 | 66 |
| | | 30 | 63 | 66 |

Table 1 clearly shows that the stability of the beer as regards the formation of a haze is improved in a great extent when using the process of the present invention and that an especially marked improvement is obtained according to embodiment III, i.e. when PVP having an average molecular weight below about 15,000 is used.

Example 2.—A number of aliquots of beer from the same mash were treated with PVP having different average molecular weight. In these tests the whole quantity of PVP was added to the filtered beer a day before the bottle filling and all bottles were pasteurized. The quantities added and the results obtained are stated in Table 2.

Table 2

| | Added amount of PVP, gms./hl. | Number of weeks, until a haze is formed | |
|---|---|---|---|
| | | Chill haze | Oxidation haze |
| Control | | 5 | 20 |
| Aver. molecular weight: | | | |
| 4,200 | 15 | 45 | 56 |
| | 30 | 58 | 61 |
| 7,500 | 15 | 47 | 61 |
| | 30 | 60 | 65 |
| 11,300 | 15 | 48 | 61 |
| | 30 | 62 | 67 |
| 16,000 | 15 | 42 | 54 |
| | 30 | 51 | 59 |
| 25,000 | 15 | 33 | 45 |
| | 30 | 38 | 50 |
| 38,000 | 15 | 30 | 41 |
| | 30 | 36 | 43 |
| 75,000 | 15 | 18 | 31 |
| | 30 | 24 | 37 |
| 220,000 | 15 | 9 | 26 |
| | 30 | 12 | 28 |
| 750,000 | 30 | 10 | 29 |

From Table 2 it can be seen that the best results are obtained when using PVP which has an average molecular weight between about 4200 and 38,000 but that PVP having a higher average molecular weight also gives a substantial improvement.

Example 3.—For the following tests there was used beer that had been obtained from different breweries and that had not been pasteurized. These beer qualities also showed a different tendency to form a haze. To the beer in question there was added a quantity of PVP having an average molecular weight of about 11,300 corresponding to 15 gms. per hectolitre. The bottles were first cooled to 0° C. whereupon 1 ml. of a solution of PVP was carefully added to each bottle. After the addition each bottle was sealed once again. In the control test 1 ml. of water was added instead of 1 ml. of the solution of PVP. All bottles were pasteurized after the PVP addition.

Table 3

| Brewery designation | Number of weeks until oxidation haze is formed | |
|---|---|---|
| | Control | PVP-treated beer |
| A | 8 | 39 |
| B | 16 | 51 |
| C | 13 | 50 |
| D | 34 | >70 |
| E | 40 | >70 |
| F | 21 | 62 |

From the results shown in Table 3 it can be seen that the addition of PVP according to the invention in all cases brings about a very substantial improvement.

*Example 4.*—In these tests there was used beer obtained from different breweries and which had not been pasteurized. The beer in all cases had a tendency to form hazes very rapidly. The beer was treated with PVP in the same manner as in Example 3 but the bottles were not pasteurized.

Table 4

| Brewery designation | Number of weeks until oxidation haze is formed | |
|---|---|---|
| | Control | PVP-treated beer [1] |
| G | 1 | >6 |
| H | 2 | >6 |
| I | 2 | >6 |
| K | 0.5 | >6 |

[1] The observations were interrupted after 6 weeks as the beer had not been pasteurized before the tests.

What I claim as my invention is:

1. A process for preventing haze formation in beverages of the group consisting of malt beverages, fruit juices and wines, comprising first adding to the beverage polyvinyl pyrrolidone in the quantity of 0 to 8 gms. per hectolitre which is necessary for maximum precipitation of the haze forming constituents, the added substance having an average molecular weight within the range of about 550 to about 2,500,000, removing the precipitate formed and further adding at least 50% of the quantity of polyvinyl pyrrolidone first added, the total quantity added, however, being at least 1 gm. per hectolitre and not more than about 500 gms. per hectolitre of the beverage.

2. A process according to claim 1 in which the added polyvinyl pyrrolidone has an average molecular weight within the range of about 15,000 to about 2,500,000.

3. A process according to claim 1, in which the total quantity of polyvinyl pyrrolidone added is between 5 and 50 gms. per hectolitre.

4. A process according to claim 1, in which the polyvinyl pyrrolidone added has an average molecular weight between about 15,000 and about 40,000.

References Cited in the file of this patent
UNITED STATES PATENTS

| 2,688,550 | McFarlane | Sept. 17, 1954 |
| 2,811,449 | Witwer | Oct. 29, 1957 |

UNITED STATES PATENT OFFICE
CERTIFICATE OF CORRECTION

Patent No. 2,919,193                    December 29, 1959

Nils Svante Berntsson

It is hereby certified that error appears in the printed specification of the above numbered patent requiring correction and that the said Letters Patent should read as corrected below.

Column 8, line 9, for "the" read -- any --.

Signed and sealed this 4th day of April 1961.

(SEAL)
Attest:    ERNEST W. SWIDER

Attesting Officer

ARTHUR W. CROCKER
Acting Commissioner of Patents